Figure 1:
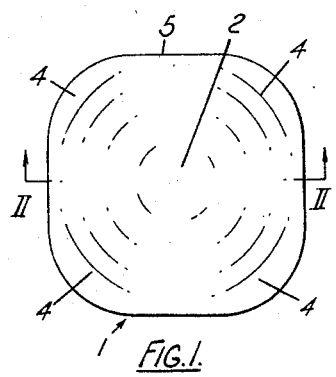

Oct. 11, 1966　　　S. T. PICKERING　　　3,278,285
METHOD AND APPARATUS FOR THE PRESSURE MOULDING OF ARTICLES
Filed June 27, 1963　　　　　　　　　　　　　　2 Sheets-Sheet 1

Inventor
Stanley T. Pickering
By
Morrison Kennedy Campbell Attorneys

Oct. 11, 1966  S. T. PICKERING  3,278,285

METHOD AND APPARATUS FOR THE PRESSURE MOULDING OF ARTICLES

Filed June 27, 1963  2 Sheets-Sheet 2

Inventor
Stanley T. Pickering
By
_____ (Attorneys)

United States Patent Office 3,278,285
Patented Oct. 11, 1966

3,278,285
METHOD AND APPARATUS FOR THE PRESSURE MOULDING OF ARTICLES
Stanley Thomas Pickering, St. Asaph, Flintshire, Wales, assignor to Pilkington Brothers Limited, Liverpool, England, a company of Great Britain
Filed June 27, 1963, Ser. No. 291,165
Claims priority, application Great Britain, July 4, 1962, 25,638/62
9 Claims. (Cl. 65—68)

This invention relates to the pressure moulding of articles having a concave upper face and a peripheral wall whose top edge is of irregular height relative to the deepest point of said face.

In particular this invention relates to the moulding of glass artices of polygonal form, for example four-sided or six-sided lens blanks.

The moulding of glass articles such as lens blanks is normally effected on a rotary turret type moulding machine in which a number of mould bodies are spaced around a rotary table and each mould body receives a charge of molten glass in turn at one station. At subsequent stations a retractable mould ring is lowered on to the mould body, and a plunger is depressed through the ring to mould the charge of molten glass into the required shape determined by the mould cavity defined by the mould body, mould ring and plunger.

Articles of this kind have been pressure moulded in a moulding apparatus in which the abutting surfaces of the mould body and the mould ring are flat so that the line of junction of these two mould parts is disposed in a horizontal plane. Because of this the mould junction mark inherently impressed on the peripheral wall of the article also lies in a horizontal plane, and all the irregular top part of the article is formed above this horizontal plane.

Because perfect alignment of the mould ring and the mould body cannot be achieved in an automatic process, it is usual to make the inside dimension of the mould ring and the outside dimensions of the top plunger, less than the inside dimensions of the mould body, so that there is sufficient tolerance to enable the lower face of the plunger to be depressed below the junction line disposed in a horizontal plane.

This dimensional difference means that the inherent mould junction mark necessarily has a stepped formation; that is there is a step in the peripheral wall of the article, all that part of the article which is formed in the mould ring above the step having smaller dimensions than that part formed in the mould body. This effect is particularly pronounced when moulding articles of polygonal form, for example polygonal lens blanks which have a convex lower surface and a concave upper surface. Such a lens blank has an irregular top edge which is higher at the corners than at the middle of the sides of the blank. The height of the corners, which are formed in the mould ring, increases as the power of the lens increases.

This stepped formation of the peripheral wall of lens blanks which are produced by the known moulding processes makes grinding of the lens blanks difficult. The blanks cannot be held firmly in chucks because of the stepped formation of the peripheral wall and so the lenses cannot be surfaced accurately. Further, an exact grinding to specification cannot be produced because the outside dimensions of the ground lens will depend on the depth of glass which is ground away from the blank.

These disadvantages have been particularly troublesome in the manufacture and grinding of blanks for bi-focal lenses. Lens blanks for this application are normally six-sided, having a dropped edge which forms the lower part of the spectacle lens, and in the known moulding process most of the dropped edge is formed in the mould ring and there has been therefore great difficulty in obtaining the required outside dimensions for the blanks.

It is a main object of the present invention to provide a pressure moulding process and apparatus in which the above-mentioned disadvantages are overcome.

A further object of the invention is to provide an apparatus in which the alignment of the mould ring on the mould body is improved in a high speed automatic machine.

According to the invention, from its broadest aspect, a method of pressure moulding an article having a concave upper face and a peripheral wall whose top edge is of irregular height, is characterised by shaping the top inner edge of the mould wall to conform with the irregular profile of the article, and applying the required pressure to mouldable material disposed in the mould through the agency of a plunger having a configuration determined by the form required for the upper face of the article, said plunger being guided by a detachable extension of the mould wall through which extension the plunger passes into the mould whereby in the finished article the inherent mould junction mark is impressed around the irregular top edge of the article.

The mould junction mark is then removed by the normal surfacing operation for finishing the upper face of the lens blank.

Further according to the invention a method of pressure moulding an article having a peripheral wall of irregular height and a concave upper face is characterised by shaping the top inner edge of the mould wall to conform with the irregular profile of the article to be produced, at a height from the bottom of the mould corresponding to the peripheral height of the moulded article, and applying the required pressure to mouldable material disposed in the mould through the agency of a plunger having a configuration determined by the form required for the upper face of the article to be produced, said plunger being guided by a detachable extension of the mould wall through which extension the plunger passes into the mould, whereby in the finished article the mould junction mark inherently impressed on the peripheral wall of the article is coincident with the irregular top edge of the article.

Still further according to the invention a method of moulding a glass article of polygonal form, having a concave upper surface and a peripheral wall, for example a lens blank, comprises defining a mould cavity of corresponding polygonal form, charging said mould cavity with a requisite quantity of molten glass, defining an extension of said mould cavity, applying moulding pressure to the charge of molten glass through said extension to form the concave upper surface of the article, the line of junction of the mould cavity and its extension being determined by the intersection with the mould cavity of a curved surface corresponding to the concave upper surface of the article so that the inherent mould junction mark produced at said line of junction is impressed around the irregular top edge of the article, and finally withdrawing said extension to permit access to the moulded article.

The invention is particularly applicable to the moulding of glass lens blanks each having a spherical concave upper surface. From this aspect the invention comprehends a method of moulding a glass article of polygonal form having a spherical concave upper surface and a peripheral wall, for example a lens blank, comprising defining a mould cavity of corresponding polygonal form, charging said mould cavity with a requisite quantity of molten glass, defining an extension of said mould cavity which extension is separated from said mould cavity by a line of junction having the form of a spherical polygon corresponding to said spherical concave surface, applying moulding pressure to the charge of molten glass through said extension to form the spherical concave surface of the article in such a way that the inherent mould junction mark produced at the line of junction is impressed around the top edge of the peripheral wall of the article, and finally withdrawing said extension to permit access to the moulded article.

The spherical surface which defines the line of junction in the mould corresponds to the spherical concave upper surface of the article to be produced. These two surfaces are both spherical but the radius of curvature of the spherical concave upper surface of the article may be slightly different from that of the spherical surface which defines said line of junction, so that the inherent mould junction mark is impressed around the top edge at a uniform small distance from the edge, and is removed during surfacing of the concave upper face of the article.

For practical purposes a matched mould ring and mould body are employed in conjunction with a number of slightly different mould plungers, having slightly different curvature.

Preferably the spherical concave upper surface of the article is formed with the same radius of curvature as that of the spherical surface defining said line of junction, so that the inherent mould junction mark coincides with the irregular top edge of the article.

The invention also comprehends apparatus for pressure moulding an article having a concave upper face and a peripheral wall whose top edge is of irregular height relative to the deepest point of said face, comprising a mould body for receiving a charge of mouldable material and having a mould wall whose top inner edge is shaped to conform with the irregular profile of the article, a detachable mould ring forming an extension of the mould wall, and a plunger having a configuration determined by the form of the concave upper face of the article, the plunger being slidable through the mould ring to apply moulding pressure to said charge, and means for moving the mould ring towards and away from the mould body and for sliding the plunger into the ring until the edges of its moulding face are adjacent the top inner edge of the mould body so that the inherent mould junction mark is impressed around the irregular top edge of the article.

Preferably the abutting faces of the mould body and mould ring are respectively matching concave and convex surfaces so that the top inner edge of the mould wall lies on a curved surface corresponding to the configuration of the molding face of the plunger.

In a preferred embodiment of the invention the matching concave and convex surfaces of the mould body and the mould ring are matching spherical surfaces, and the moulding face of the plunger is a spherical convex surface having the same radius of curvature as said matching spherical surfaces, so that in the lowest position of the plunger its convex face forms a continuous surface with the matching abutting faces of the mould body and mould ring.

That is, in its lowest position in the mould ring the convex face of the plunger lies on the same spherical surface as the top edge of the mould, and the inherent mould junction mark is coincident with the irregular top edge of the article.

The invention also comprehends moulded articles produced by the method set out above, for example a glass lens blank having a concave upper face and a peripheral wall whose top edge is of irregular height relative to the deepest point of said face.

Figure 3:
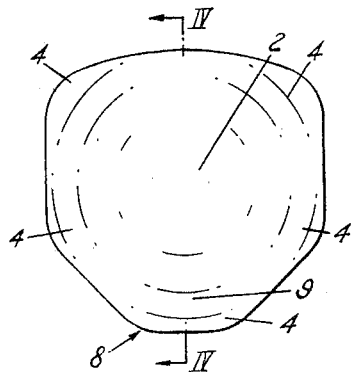
Figure 2:
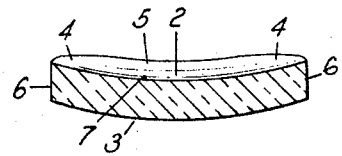
Figure 4:
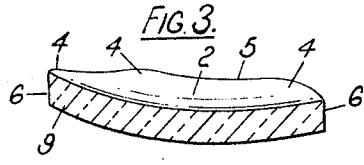
Figure 5:
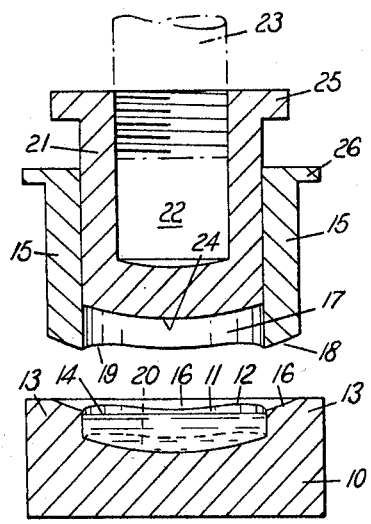
Figure 6:
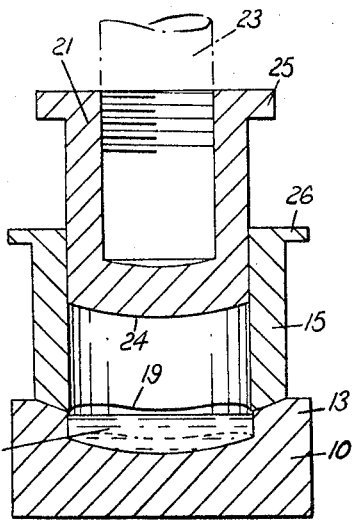
Figure 7:
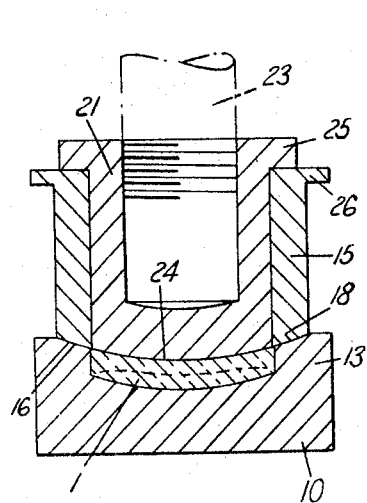
Figure 8:
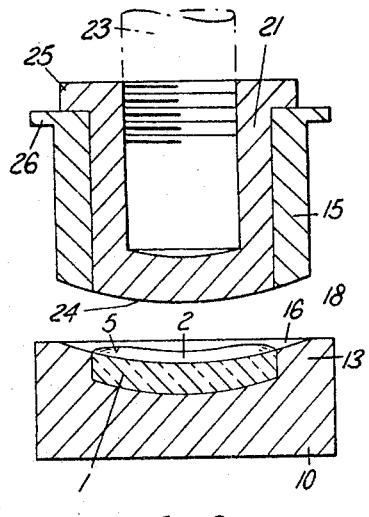
Figure 9:
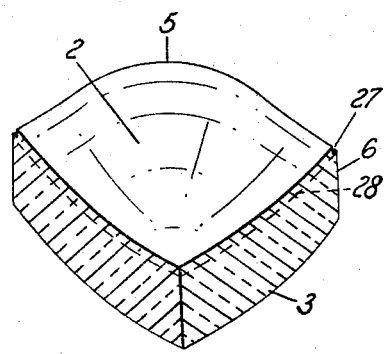
Figure 10:
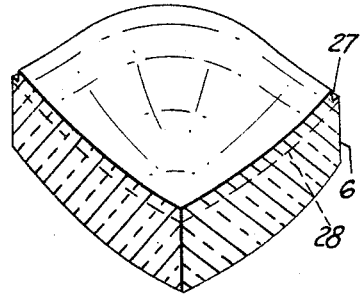

In order that the invention may be more clearly understood an embodiment thereof, for moulding lens blanks of polygonal form, will now be described, by way of example, with reference to the accompanying drawings, in which:

FIGURE 1 illustrates in plan a four-sided lens blank moulded by a method according to the invention, FIGURE 2 is a section on the line II—II of FIGURE 1, FIGURE 3 is a plan view of a six-sided dropped edge bifocal lens blank moulded by a method according to the invention, FIGURE 4 is a section on line IV—IV of FIGURE 3, FIGURE 5 is a vertical section through moulding apparatus according to the invention, and the mould being shown open and charged with a requisite quantity of molten glass, FIGURES 6 to 8 respectively illustrate stages in the moulding operation, and FIGURES 9 and 10 show top edge formations of moulded lens blanks according to the invention.

In the drawing like references indicate the same parts.

FIGURES 1 and 2 of the drawings illustrate a four-sided lens blank 1 moulded by a method according to the invention. The blank 1 has a concave upper face 2 and a convex lower face 3. The lens blank 1 has rounded corners 4 which rise above the level of the middle of the sides of the blank, so that the top edge 5 of the peripheral wall 6 of the blank is of irregular height relative to the deepest point 7 of the concave upper face 2.

FIGURES 3 and 4 illustrate a six-sided lens blank 8 for use in making a bifocal spectacle lens. The blank has a concave upper face 2 and rounded corners 4, the top edge 5 of the peripheral wall 6 being of irregular height, and the blank has a dropped edge 9, being that part of the lens which is of different power in the finished lens.

Lens blanks of such polygonal form are usually pressure moulded on a rotary turret type moulding machine in which a number of mould bodies 10, FIGURE 5, are fixed around a rotary table which is rotated stepwise so that each mould body 10 passes through a series of stations in succession. FIGURES 5 to 8 illustrate the moulding of a lens blank of the kind shown in FIGURES 1 and 2.

The mould body 10 has a central bore which defines a mould cavity 11 of polygonal form corresponding to the polygonal form of the lens blank 1 to be produced, and the top inner edge 12 of the mould wall 13 is shaped to conform with the irregular profile of the top edge 5 of the blank. At one station the mould cavity 11 is charged with a requisite quantity of mouldable material, which in this embodiment is molten glass, indicated at 14, and the mould body 10 is then moved to another station of the machine at which a mould ring 15 which forms a detachable extension of the mould wall 13 is lowered on to the mould body 10.

The desired shape of the top inner edge 12 of the mould wall is obtained by forming a spherical concave surface 16 on the top of the mould wall 13. The intersection of this spherical surface 16 with the mould cavity 11 defines the required edge 12 which conforms with the irregular profile of the lens blank to be produced, at a height from the bottom edge of the mould cavity corresponding to the peripheral height of the wall 6 of the article. The bore 17 through the mould ring 15 is of the same polygonal form as the mould cavity 11, and the lower face 18 of the mould ring 15 is formed as a spherical surface exactly matching the surface 16 on the top of the mould wall.

The lower inner edge 19 of the mould ring thus has a profile exactly matching the upper inner edge 12 of the mould wall, so that when the mould ring 15 is lowered on to the mould body 10, as shown in FIGURE 6, there is exact matching of the surfaces 16 and 18, and of the edges 12 and 9 which define the line of junction of the ring and body. The matching of the surfaces 16 and 18 when the mould ring 15 is lowered on to the mould body 10 greatly assists the alignment of the mould ring on the mould body.

The internal dimensions of the mould cavity 11 are the required outer dimensions of the lens blank, and the internal dimensions of the mould ring 15 are slightly less than the internal dimensions of the mould cavity 11.

The mould cavity 11 has a floor 20 of concave form corresponding to the required convex lower surface of the lens blank.

The required moulding pressure is then applied to the charge 14 of molten glass through the agency of a plunger 21 having a configuration determined by the concave form required for the upper face 2 of the lens blank to be produced. The outer dimensions of the plunger 21 correspond to the dimensions of the inner bore 17 of the mould ring 15, and the plunger is formed with a central recess 22 which is internally threaded to receive an operating rod indicated at 23.

In this embodiment of the invention the plunger 21 has a spherical, convex lower face 24 which forms the spherical concave upper face 2 of the lens blank, and the radius of curvature of the face 24 of the plunger is the same as the radius of curvature of the matching spherical surfaces 16 and 18. When the plunger 21 is pressed downwardly by the rod 23, being guided by the mould ring 15, the face 24 enters the molten glass 14, and downward movement of the plunger 21 into the glass 14 continues until a flange 25 on the top of the plunger abuts against a top flange 26 on the mould ring, as shown in FIGURE 7. In this position the face 24 of the plunger lies on the same spherical surface as the line of junction of the mould ring and mould body, so that the mould junction mark inherently impressed on the peripheral wall 6 of the blank is coincident with the irregular top edge 5 of the lens blank. This is illustrated in FIGURE 9 which shows the mould junction mark 27 coincident with the irregular top edge 5 of the blank.

Because the mould junction mark 27 is at the upper edge of the blank the peripheral wall 6 does not have a stepped formation and the blank can be gripped satisfactorily in a grinding chuck.

When the upper face 2 of the lens blank of FIGURE 9 is surfaced by grinding and polishing operations so that the finished lens surface is at the level indicated by the dotted line 28, the mould junction mark 27 is removed so that the peripheral wall 6 of the finished lens has uniform diametric dimensions.

Although in the ideal case just described the spherical surfaces 16, 18 and 24 exactly match, for all practical purposes a matched mould ring and body can be employed with a number of different plungers 21 for producing different upper concave surfaces 2. The radius of curvature of the face 24 and the plunger 21 can therefore be within a range lying on either side of the radius of curvature of the surfaces 16 and 18. At the most, only the margins of the concave upper surface 2 of the lens blank 1 are formed in the mould ring 15 and in that case, as shown in FIGURE 10, the mould junction mark 27 is impressed around the top edge 5 of the blank, and has the form of a very shallow step of uniform depth around the whole of the top edge of the peripheral wall 6. Substantially all of the peripheral wall 6 of the blank thus has the required dimensions determined by the mould cavity 11, and the blank can be gripped firmly in a chuck. The stepped mould junction mark 27 is ground away when the lens is surfaced to the level 28 so that the outside dimensions of the whole of the finished lens are those determined by the mould cavity 11.

When the moulded lens blank 1 has stiffened sufficiently to hold its shape, the mould ring 15 and plunger 21 are retracted together as shown in FIGURE 8 to permit access to the moulded blank 1 which is lifted out of the mould body 10 by a take-out mechanism in well known manner at a further station of the moulding machine.

Thus by the applicant's invention it is possible to produce lens blanks, particularly square ophthalmic lens blanks which have a peripheral wall which is suitable for accurate holding of the blanks and accurate grinding to form lenses having uniform diametrical dimensions. Further, the invention has made it possible for the first time to use a fully automatic process for the manufacture of six-sided lens blanks 8 of the kind illustrated in FIGURES 3 and 4.

Although the invention has been described with reference to a solid mould body in which the mould cavity is defined, the mould body 3 may take the form of an annular body having a central bore of polygonal form corresponding to that of the blank to be moulded and a bottom plunger slidable in the annular part and having an upper concave face for moulding the convex lower face 3 of the lens blank. The bottom plunger is adjustable to the required depth in the annular mould body.

This depth is determined by the required thickness of the blank having in mind the power of the lens to be produced, which is determined by the curvature of its two faces.

The invention also comprehends moulded glass articles, for example ophthalmic lens blanks of polygonal form and lenses produced from the blanks.

I claim:

1. A method of pressure moulding an article having a lower face and an upper concave face and having a peripheral wall with an irregular edge on said upper face, varying in height in relation to the lowest point on said upper face, which method comprises providing a mould cavity having a base conforming in size and shape with said lower article face and an irregular upper edge which conforms in size, shape and height with said article edge, placing a requisite quantity of mouldable material in said cavity, applying moulding concaving pressure to said material internally of and through an upward extension of said mould cavity conformably forming with said mould cavity edge a junction near the top of said mould cavity, said pressure being applied over an area of said material, coextensive with the area of said concave face to form said material into a moulded body having a shape corresponding to that of said article with the same lower face and the same upper concave face, and with the same irregular upper face edge, and having an inherent junction mark, which is impressed around the peripheral wall of said moulded body and which is located in the region of its upper face edge and follows the same irregular form as the upper face edge of said moulded body, so that the distance between the upper face edge of said moulded body and the impressed junction mark is constant around the entire periphery of the moulded body, separating said upward extension from said mould cavity to open up said mould cavity around its upper edge, and removing the moulded body from the mould cavity.

2. A method according to claim 1, said article having its upper face edge deviating in plan view from circularity concentric with the lowest point on its upper concave face, and having a height at any point in relation to said face point depending on the extent of deviation of said point from said circularity and increasing as the deviation increases.

3. A method according to claim 2, in which the article to be produced is of polygonal form and the mouldable material is glass to form a glass body in the nature of a lens blank.

4. A method according to claim 3, in which the moulding pressure is applied with spherical concave forming characteristics to shape the moulded body with an upper spherical concave face, and in which the confronting junction surfaces are spherical and have polygonal shapes on their inner peripheries corresponding to the polygonal shape of the article to be produced.

5. A method according to claim 4, in which the radius of curvature of the spherical concavity shaped into the upper face of the moulded body is the same as the radius of curvature of the confronting surfaces defining said junction, and the moulding pressure is applied to cause the inherent mould junction mark impressed on the moulded body, to coincide with the irregular top edge of the moulded body.

6. A moulded article made by the method of claim 1.

7. An apparatus for pressure moulding an article, which comprises a mould body defining a mould cavity for receiving a charge of mouldable material, said mould cavity having a base and an upstanding peripheral wall of height varying relative to the deepest point of the mould cavity to define an upper edge of corresponding varying height, a mould ring removable from said mould body and having a hollow, which in operative position of said ring constitutes an upward extension of said mould cavity, said ring having a lower edge conforming in contour with and following the upper edge of said mould cavity, and in operative position being seated on said mould body to form a junction between said conforming edges, a plunger in said ring having a snug conforming slide fit therein, and having a lower moulding convex face peripherally bounded by an edge conforming in contour with and following the upper edge of said mould cavity, the plunger being slidable through the mould ring to apply moulding pressure to the charge of moulding material in said cavity, means for moving the mould ring towards and away from the mould body, and means for sliding the plunger in the ring away from said mould body and towards said mould body to a final moulding position in which the peripheral edge of the moulding face of the plunger is adjacent to and conformably follows the upper edge of said mould cavity as well as said junction, whereby the distance between said junction and the moulding face edge of said plunger in said final moulding position of said plunger is constant around the entire periphery of said mould cavity, and the charge of mouldable material in said mould cavity will be shaped into an article having an upper concave face with a peripheral edge varying in height relative to the deepest point on said concave face, and the peripheral wall of said article will have impressed thereon an inherent junction mark of height-varying form located in the region of and conformably following the peripheral edge of the concave face of said article.

8. Apparatus according to claim 7, wherein the abutting faces of the mould body and mould ring along said junction are respectively matching concave and convex surfaces so that the upper edge of the mould cavity lies on a curved surface corresponding to the configuration of the moulding face of the plunger.

9. Apparatus according to claim 8, wherein said mould cavity is polygonal in horizontal cross-sectional shape, and wherein said matching concave and convex surfaces of the mould body and the mould ring are matching spherical surfaces, and the moulding face of the plunger is a spherical convex surface having the same radius of curvature as said matching spherical surfaces, so that in the lowest position of the plunger, its convex face forms a continuous surface with the matching abutting faces of the mould body and mould ring.

References Cited by the Examiner

UNITED STATES PATENTS

| 1,909,778 | 5/1933 | Marsden | 65—68 |
| 2,975,554 | 3/1961 | Stutske et al. | 65—70 |

FOREIGN PATENTS

| 739,341 | 10/1955 | Great Britain. |
| 413,272 | 4/1946 | Italy. |

DONALL H. SYLVESTER, *Primary Examiner.*

F. W. MIGA, *Assistant Examiner.*